United States Patent [19]

Norris, Jr. et al.

[11] Patent Number: 5,056,849
[45] Date of Patent: Oct. 15, 1991

[54] LIMOUSINE CONSTRUCTION

[75] Inventors: Frank W. Norris, Jr., Lima; Charles L. Travis, West Liberty; Ronald Benedict, Lima, all of Ohio

[73] Assignee: Superior Coaches, Stamford, Conn.

[21] Appl. No.: 523,836

[22] Filed: May 14, 1990

Related U.S. Application Data

[63] Continuation of Ser. No. 303,578, Jan. 27, 1989, abandoned.

[51] Int. Cl.$^5$ .............................................. B60N 2/10
[52] U.S. Cl. ..................................... 296/65.1; 297/93; 297/468
[58] Field of Search .................... 296/65.1; 297/92, 93, 297/94, 100, 101, 103, 468, 473

[56] References Cited

U.S. PATENT DOCUMENTS

| | | | |
|---|---|---|---|
| 324,129 | 8/1885 | Livesey et al. | 297/92 |
| 802,519 | 10/1905 | Long | 297/93 |
| 2,858,880 | 11/1958 | Fox | 297/93 |
| 3,012,817 | 12/1961 | Hendrickson et al. | 297/93 |
| 3,127,652 | 4/1964 | Springer | 297/468 X |
| 3,311,412 | 3/1967 | Kelly | 297/468 |
| 3,328,081 | 6/1967 | Scruggs | 297/468 |
| 3,501,200 | 3/1970 | Ohta | 296/65.1 X |
| 3,529,863 | 9/1970 | Belfry | 297/92 X |
| 3,743,350 | 7/1973 | Allen | 297/94 |
| 3,844,608 | 10/1974 | Freedman | 297/92 |
| 3,955,846 | 5/1976 | Murphy | 296/65.1 |
| 4,014,585 | 3/1977 | Earnhart | 296/16 |
| 4,451,087 | 5/1984 | Tamamushi | 297/468 |
| 4,576,414 | 3/1986 | Molnar et al. | 297/468 X |
| 4,779,917 | 10/1988 | Campbell | 296/65.1 |
| 4,822,104 | 4/1989 | Plesniarski | 297/468 |

FOREIGN PATENT DOCUMENTS

| | | | |
|---|---|---|---|
| 282587 | 6/1965 | Australia | 297/94 |
| 838616 | 5/1952 | Fed. Rep. of Germany | 297/92 |
| 2823529 | 12/1979 | Fed. Rep. of Germany | 297/92 |
| 703379 | 12/1979 | U.S.S.R. | 297/94 |
| 29715 | 10/1928 | United Kingdom | 297/92 |

Primary Examiner—Margaret A. Focarino
Assistant Examiner—Gary C. Hoge
Attorney, Agent, or Firm—Pravel, Gambrell, Hewitt, Kimball & Krieger

[57] ABSTRACT

A limousine construction provides a limousine body having an exterior portion with a roof, floor, and sides and six doors which include three right-hand and three left-hand side doors, each with forward pivotally attached edges. The doors include left and right doors which are positioned in pairs including a forward pair, a center pair, and rear doors. The three pairs of doors are positioned to define three seating areas for front, center, and rear seats. Each seat extending transversely fully across the vehicle interior and communicating with the respective pair of doors. The center seating includes a base which is anchored to the vehicle chassis floor between the front and rear seats and includes a generally ell-shaped composite seat/seat back assembly which is movably mounted upon the base between a forward facing and a rearward facing position. The seat and seat back retain the generally ell shape during transition between the front and rear facing positions and a seat mechanism raises the ell-shaped center seat upwardly off the base during the transition from the forward to the rear facing position.

5 Claims, 3 Drawing Sheets

LIMOUSINE CONSTRUCTION

This is a continuation of co-pending application Ser. No. 07/303,578 filed on Jan. 27, 1989 abandoned.

GENERAL BACKGROUND OF THE INVENTION:

1. Field of the Invention

The present invention relates to vehicle constructions, and more particularly relates to an improved configuration for six-door limousines wherein a center seat, positioned between front and rear seats, can move between forward and rearward facing positions, and wherein the seat retains a generally L-shaped configuration during transition between said forward and rearward facing positions, and the seat elevates upon a pivoting link during such transition.

2. General Background

Elongated luxury automobiles, such as limousines, typically have elongated vehicle bodies that include a forward engine compartment covered with a hood, a central passenger compartment with multiple seating arrangements, and a trunk area aft. A common arrangement for limousines provides front and rear seats with a large open area between the front and rear seats which can be equipped with foot rests for the passengers to provide an elongated area of leg room.

In a six-door limousine however, there are three sets of laterally extending seating areas including front, middle, and rear seating areas. Typically, each seating area of a six-door limousine can be accessed from either left-hand or right-hand side doors. The doors are arranged in pairs, including, e.g., front left and right doors which are positioned immediately beside the front seat. Similarly the second pair of doors accesses the center seat while the aft pair of doors accesses the rear seat. This arrangement allows passengers to enter the vehicle on either side and at any of the three positions in order to sit in one of the sitting arrangements. However, because of space considerations and constraints, it is difficult to obtain a large amount of foot room within a six-passenger limousine. Each seating area of a six-door limousine must have seat belts for the occupants in order to prevents loss of life or personal injury if possible during an accident. This lack of space and problem of seat belt availability presents a problem if a different and convertible seating arrangement is desired for a six-door limousine. Still further problems are present in attempting to have a seating arrangement for a six-door limousine if the passenger seats are to shift for facing optionally different directions.

The problem of seating arrangements in vehicles has been the subject of several U.S. patents. An example of an early patent is U.S. Pat. No. 1,423,508, entitled "Car Seat Construction," which relates to a seat that can afford the passenger the ability to sit facing forwardly or rearwardly.

A convertible-type seat arrangement for water craft is seen in U.S. Pat. No. 2,383,178, entitled "Convertible Seat Structure For Cabin Cruisers."

An automobile construction having seats which fold into different configurations is seen in the Willson U.S. Pat. No. 3,097,876, entitled "Family Car Ensembles."

Some patents have been granted which are directed to a seat mechanism for providing a reversible or convertible seat structure. One such example is the Bell et.al. U.S. Pat. No. 3,856,347 which provides a convertible and reversible seat structure such as the type used in recreational vehicles. The apparatus includes a load supporting base with two pivotally attached frame members which may be alternated between a vertical position and a horizontal position such that the direction of seating is reversed and means is provided to adjust the frame members relative to one another to vary their relative inclination.

Another reversible seat is provided by U.S. Pat. No. 3,955,846 entitled "Reversible Seat Apparatus." The '846 patent includes a seat located in a vehicle for seating passengers in a forward direction or alternatively in a rearward direction. The seat apparatus has a frame carrying a backrest cushion and a seat cushion. Two pairs of legs attach the frame to a support secured to the floor of the vehicle. A releasable lock assembly has upright support members which engage pins in the legs to hold the frame in a first seating position and in a second seating position. A release arm connected to one of the legs is operable on application of force thereto to move the members from the pins whereby the frame can be moved to its second seating position.

In the Logsdon U.S. Pat. No. 4,081,051, there is provided a seat for a dual-purpose vehicle having a first implement at the front and a backhoe at the rear wherein the seat provides a reversible back carried upon an adjustable support which includes a seat mounting carriage that has a forward end on rollers and a rearward end supported by links so that by use of a manual lever which is pivoted adjacent the seat and operatively connected to the rear part of the carriage the seat may be elevated and moved rearwardly so as to provide a more favorable seat position for backhoe operation.

A multi-purpose convertible seat construction is provided in the Garza et.al. U.S. Pat. No. 4,168,860. The seat construction of the '860 patent includes a back section and a seat section interconnected and supported so that they may be selectively positioned to constitute a forwardly facing seat, a rearwardly facing seat or a sleep surface in which the back and seat sections are disposed in co-planar relation. Thus, the two seat parts are movable with respect to one another into the multiple positions.

Another reversible seat assembly is seen in the Hodge et.al. U.S. Pat. No. 4,322,052, entitled "Latch Assembly-Reversible Seat." The device disclosed in the '052 patent features a latch assembly for locking a vehicle operator's seat assembly in either a forward or a reverse operating position and includes a cam selectively positionable in response to movement of the seat assembly and an arm assembly and a pin for releasable engaging the cam and cooperating therewith in locking the seat assembly in position.

A walk-over seat is the subject of U.S. Pat. No. 4,407,542. The seat features a pair of side members and a seat back which may be moved between the front and rear ends of the seat. The seat back is connected to the upper ends of two elongated links on each side of the seat back. Each link has a lower end mounted for pivotal movement about a horizontal axis between frontwardly and rearwardly extending positions. Each link is engaged by a respective latching member when the link is in one of its positions. Structure is provided to transfer to the side members of the seat the load exerted against a latching member by the link when the seat back is impacted or hit from behind, to prevent the latching member from being sprung or bent out of position. The latching member has a special configuration to accommodate different dispositions and mountings of the latching member and the link it engages.

In U.S. Pat. No. 4,779,917, there is provided a reconfigurable rear seat for vans or station wagons. The bench-type rear seat has three sections independently movable about a common laterally extending pivot axis. The rear seat is positioned in a van or station wagon behind the front seat for seats where the driver sits. The section includes a pair of cushions that may function either as upright backrests or as posterior supports, or as bed cushions. The third section comprises a wrap around control bar that is used to establish the upright position of one of the cushions. By moving the sections, the seat can be configured so that the passengers can face forwardly or rearwardly. The sections can also be moved to provide a flat bed. The wrap around control bar includes head rests and locking mechanisms for fixing the position of the upright backrest section. Adjustable head rests and arm rests are also provided. Shoulder type seat belts are connected to the control bar so that they may be used whether the seat is arranged for forward or rearward sitting. An integral lumbar support cushion may be folded down in both the forward and rearward facing configurations. The mounting position of the rear seat in the van or station wagon may be adjusted infinitely by sliding forward and back on the tracks. The seat may be folded up and moved to a stowed position, for example, directly behind the front seat. Some convertible seats are commercially available which can face forward, rearward, or collapse into a flat configuration to form a bed. Such commercially available seats are available from, for example, Flexsteel Industries, Inc. and Kustom Fit Mfg. Co.

These prior art patents deal primarily with seat mechanisms which would be adaptable to mounting on open floor areas in vehicles such as vans and station wagons where space for multiple and convertible seats is not a problem. Many of the prior art mechanisms are generally complicated which could present problems in use with six-door, three seat limousines wherein conversion of the seat must be done very rapidly, with minimum effort, and without the danger of injury to one of the users. Some mechanisms have complex linkage which might catch a passenger's fingers, for example. Further, because limousines have limited interior seating area, when equipped with six doors and three seating areas, space is at a premium. While van-type configurations use substantially the full length of a vehicle, limousines generally have a confined interior area because they are equipped with a trunk area for stowing the luggage of users/passengers, and an elongated engine compartment area. Thus, seating arrangements which might work well for cargo vans and the like present particular problems with six-door, three seat limousines.

Many of the references of the prior art relate to convertible seats wherein the seat back alone moves with respect to the base. Other configurations use seats and seat backs which are independently movable with respect to one another so that a bed can be formed.

The present invention provides an improvement over the prior art in that a simple, straightforward yet workable seating configuration is provided for limousines having six doors which include a front, middle, and rear pair of doors, each pair of doors corresponding to a seat area which includes forward, center, and rear seat areas.

SUMMARY OF THE PRESENT INVENTION

The present invention provides a limousine construction that includes an exterior body with a roof, floor, and sides defining an interior for containing passengers, and the body includes six doors, namely, three right and three left-hand side doors each arranged in pairs and each with forward pivotally attached edges mounted to the body. The doors are positioned in pairs including forward, center, and rear doors.

A plurality of seats includes front, center, and rear seat areas. Each seating area extends transversely, fully across the vehicle interior, so that each seat has end portions that communicate with the immediately adjacent door opening of the respective front, center, and rear pair of doors. In this manner, passengers can access any of the seating areas from either side of the vehicle via any of the doors.

The center seat includes a base portion which is anchored to the vehicle floor and spaced generally between the front and rear seating areas, providing floor space for the feet of passengers between the base and the respective front and rear seats. The center seat includes a generally L-shaped composite seat/seat back assembly movably mounted upon the base between forward facing and rearward facing positions. The seat/seat back retains the generally L shape during transition between the front/rear facing positions.

In the preferred embodiment, first and second pluralities of seat belt anchors are positioned along the front and rear respective surfaces of the center seat base.

In the preferred embodiment, the center seat includes first and second cushioned seat elements which are connected with respect to each other in an L configuration, and left and right seat support flanges rigidly hold each of the cushioned seat elements with respect to each other so that the L configuration is maintained by the flanges which structurally hold the seat/seat back together.

In the preferred embodiment, the base features a moving seat support mechanism that translates the center seat upwardly with respect to the base during transition between the forward and rearward facing positions.

In the preferred embodiment, the moving support mechanism includes a pair of left and right pivot arms, each mounted at one end portion thereof to the base, and at the other end portion thereof to one of the flanges.

BRIEF DESCRIPTION OF THE DRAWINGS

For a further understanding of the nature, objects, and advantages of the present invention, reference should be had to the following detailed description, taken in conjunction with the accompanying drawings, in which like reference numerals denote like elements, and wherein.

Figure 1:
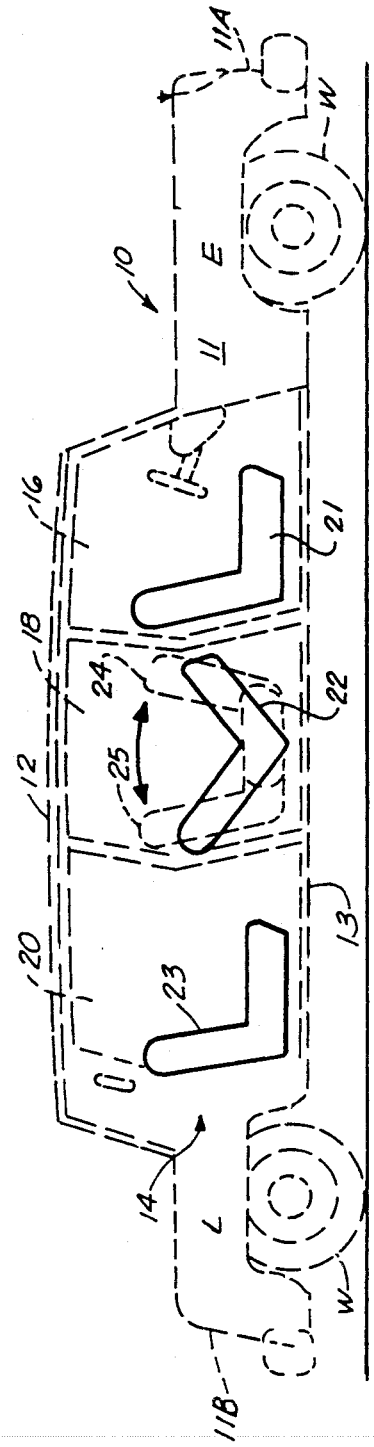
FIG. 1 is a side elevation view of the preferred embodiment of the apparatus of the present invention illustrating the vehicle body in phantom lines.

DETAILED DESCRIPTION OF THE PREFERRED EMBODIMENT:

FIGS. 1-7 illustrate the preferred embodiment of the apparatus of the present invention designated generally by the numeral 10.

In FIGS. 1-4, there can be seen limousine construction 10 including a body 11 having a front 11A, rear 11B, roof 12, floor 13, and sides 14. The body 11 has a forward section which is an engine compartment E, a rear section which is a luggage compartment or truck L, and a plurality of wheels W. A plurality of doors 15-20 are provided along the sides 14 and include front, left, and right doors 15, 16; center left and right doors 17, 18; and rear left and right doors 19, 20. Each pair of doors 15-16, 17-18, 19-20 is positioned adjacent an associated seating area 21-23. Thus, in FIG. 2 there can seen a forward or front seat 21 which is positioned adjacent front left and right doors 15, 16. Similarly, center seat 22 is positioned between left and right doors 17, 18, and rear seat 23 is positioned between rear doors 19, 20. The seats 21-23 define seating areas which extend fully across the vehicle interior body between sides 14. Thus, a passenger can access the vehicle interior and any one of the three seating areas 21-23 by entering from the left or from the right side of the vehicle. Passengers can enter the center seating area and sit upon seat 22 by using left-hand door 17 or right-hand door 18.

Figure 2:
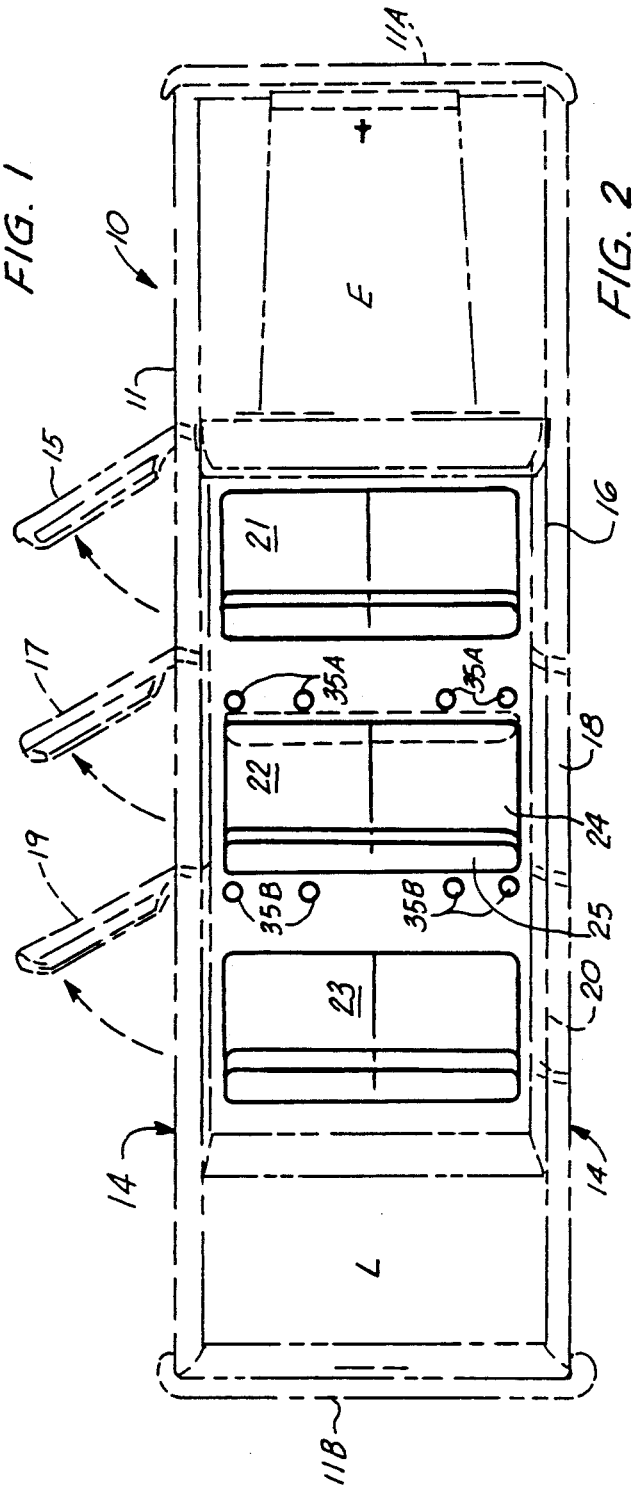
FIG. 2 is a top plan view of the preferred embodiment of the apparatus of the present invention illustrating the vehicle body in phantom lines.

The center seat 22 is a movable seat which can be converted to a rearward facing configuration or to a forward facing configuration. In FIG. 2, the forward facing configuration for center seat 22 is shown in hard lines, while the rearward facing configuration in FIG. 2 is shown in phantom lines illustrating the position of the seat back in the rearward facing position.

In FIG. 1, both the forward and rearward facing positions are illustrated in phantom lines while a transition position of the center seat 22 is shown in hard lines.

Figure 3:
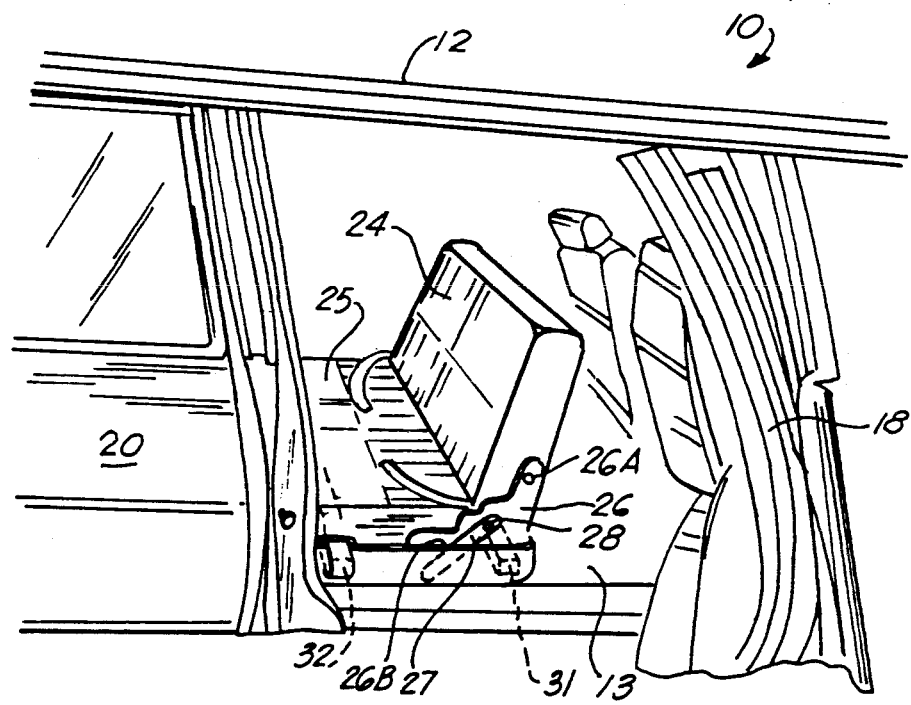
FIG. 3 is a fragmentary perspective view of the preferred embodiment of the apparatus of the present invention with the center seat in a rearward facing position.
Figure 4:
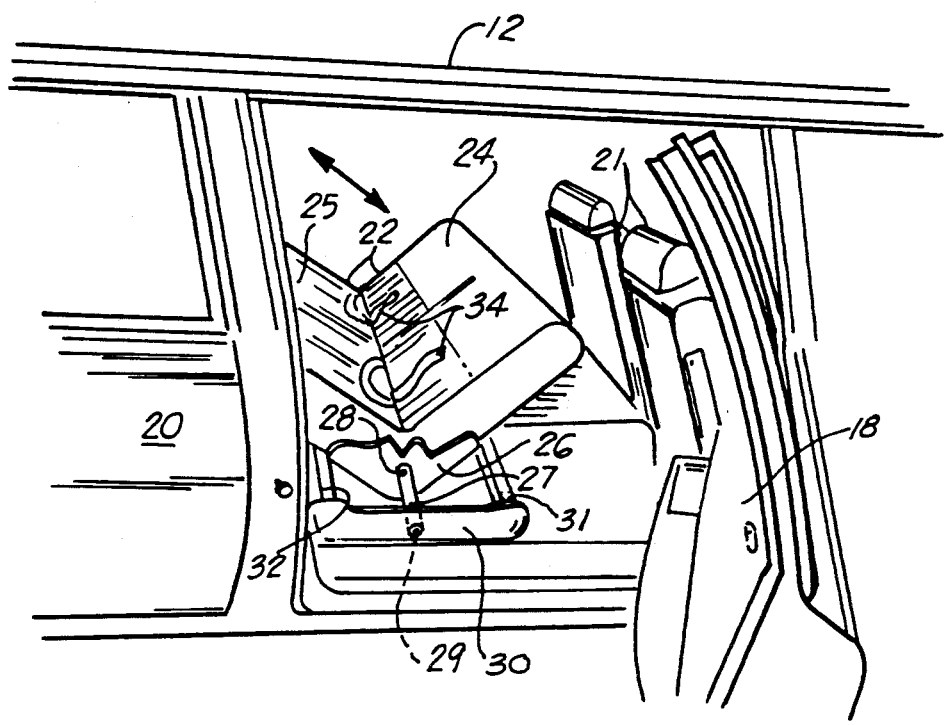
FIG. 4 is a fragmentary perspective view of the preferred embodiment of the apparatus of the present invention illustrating the center seat in a transition, moving toward a forwardly facing position.

In FIGS. 3 and 4, there can be seen respectively the rearward position of center seat 22 and a transition position of seat 22.

Center seat 22 includes a pair of cushioned seat elements 24, 25 including a forward cushioned seat element 24 and a rear or aft cushioned seat element 25. The seat elements 24, 25 are rigidly attached with respect to each other with L-shaped flanges 26 so as to define a generally L-shaped configuration for the center seat 22 when viewed from the side (see FIGS. 1 and 7). As can be seen in FIGS. 1 and 2, each of seats 21, 22, and 23 has two end portions that communicate with the door openings of the respective front, center, and rear pairs of doors 15-16, 17-18, and 19-20. The center seat 22 is desirably maintained in this L-shaped configuration because of the lack of space which is provided between the front seat 21 and the rear seat 23 for a six (6) door, three (3) seat limousine. By maintaining the center seat 22 in an L-shaped configuration at all times, even during transition, transition can be accomplished in a simple, straightforward yet functional manner. This means that the seat element 25 functions as the seat bottom when seat 22 is in a rearward position (FIG. 3), and element 24 functions as the seat bottom when the seat 22 is in the forward facing position (see FIG. 2). Thus, both cushioned seat elements 24, 25 function as a seat bottom and as a seat back depending upon the directional orientation of the seat 22. In FIG. 4, there can be seen a transition position for seat 22 wherein the seat 22 has been lifted from its base support 30 and is being moved into a different passenger facing arrangement. The link 27 causes the center of the seat to translate upwardly during the transition.

L-shaped flanges 26 can be equipped with laterally extending fore and aft stop pins to limit rotation of each flange 26 with respect to link 27 as the seat 22 is moved from a transition position (FIG. 7), to an operative position. One of the stop pins 26A, 26B rests upon link 27 when seat 22 is moved to an operative position such as forward facing (FIG. 2) or aft facing (FIG. 3). The link 27 and a stop pin 26A, 26B thus also help support the seat 22 when in an operative position.

Figures 5, 6, 7:
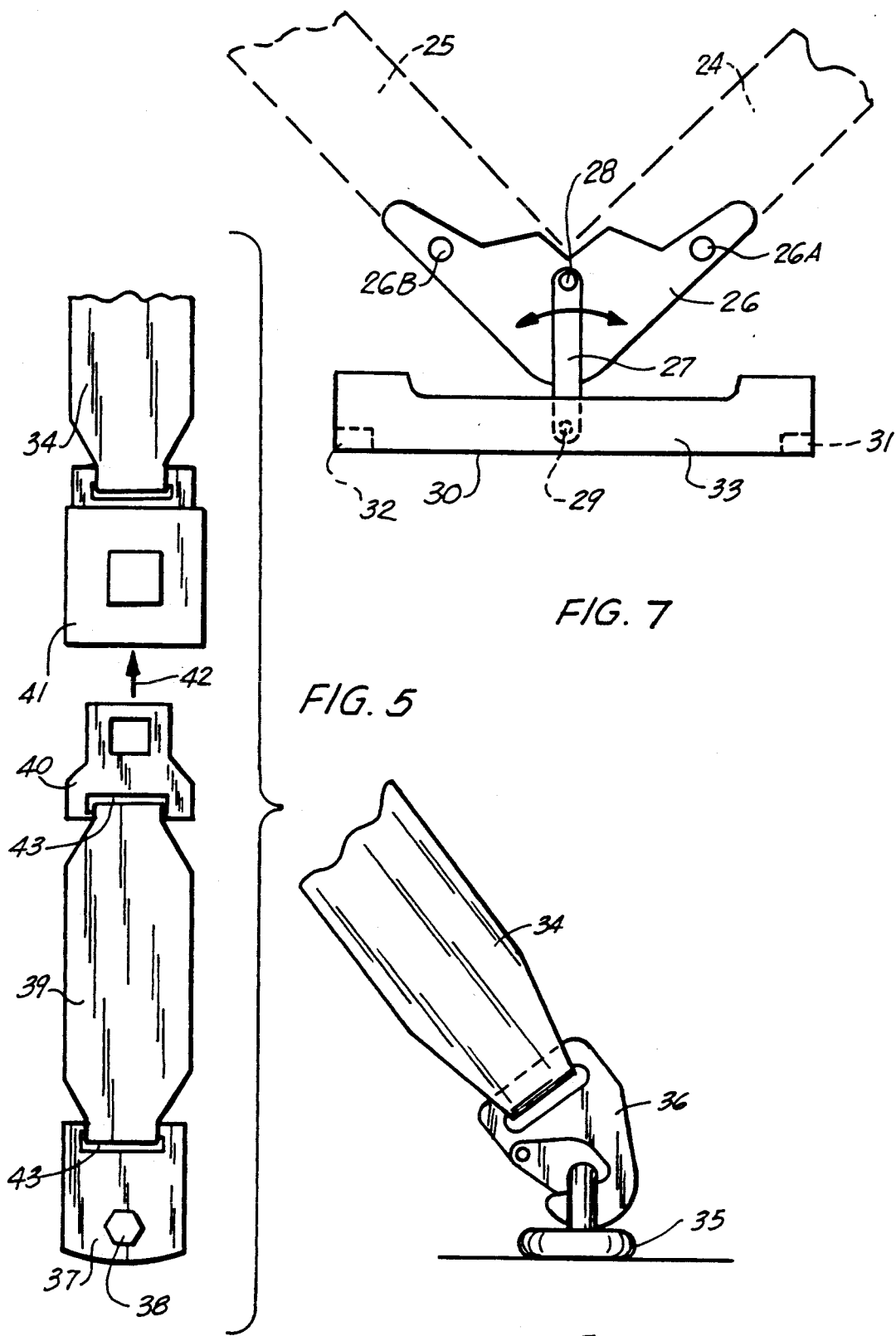
FIG. 5 is a fragmentary view illustrating the removable seat belt anchor arrangement of the preferred embodiment of the apparatus of the present invention.
FIG. 6 is a fragmentary view illustrating the seat belt eye bolt connection portion of the preferred embodiment of the apparatus of the present invention.
FIG. 7 is a schematic side fragmentary view illustrating the transition position of the center seat and the seat base.

Seat 22 is supported upon seat base 30 which includes left and right side members 33 and base 30 can include a plurality of transversely extending support bars including forward transverse support bar 31 and rear transverse support bar 32. It should be understood that other transversely extending support bars (not shown) can be used to form the structure connection between left and right side walls 33 and as an underlying base support for the seat in order to insure proper support and comfort to the user. The seat cushioned elements 24, 25 can rest upon the pair of transverse support bars when the seat 22 has finally been placed in an operative position. In the transition position of FIG. 4, seat 22 has been lifted upwardly and link 27 is pivoting about base pivot 29. Pivot 29 can, for example, be a transversely extending pin or rod which extends fully across the seat base 30 between left and right sides 33. In FIG. 7, a side view is illustrated. However, it should be understood that the side view of FIG. 7 illustrates the right-hand side view of seat 22 and its base 30. The left-hand side view would be an essentially identical construction to that shown in FIG. 7, but a mirror image thereof. Thus, two base side walls 33, two links 27, two pivots 28, and two pivots 29 would be provided. Likewise, seat 22 includes a pair of left and right flanges 26 which rigidly affix the left and right sides of the cushioned seat elements 24, 25 with respect to one another. As can be seen in FIG. 4, flanges 26 are shaped to conform to a portion of each of the sides of seat elements 24 and 25.

In order to provide seat belts for the users of center seat 22 no matter whether the seat is forwardly or rearwardly facing, a plurality of eye bolts 35 are provided including a first plurality 35A of eye bolts positioned along the forward edge of base 30 and a second plurality of eye bolts 35B positioned along the rear of base 30 (see FIG. 2). In FIG. 6, each eye bolt 35 can be equipped with a removable seat belt support bracket 36 and a flexible seat belt 34 which are commercially available items.

In FIG. 5, an alternate construction for the seat belts is provided. In the embodiment of FIG. 5, a plurality of seat belt anchor plates 37 would be positioned forwardly along the front edge of seat base 30 as with the positioning of eye bolts 35A in FIG. 2. A similar plurality of anchor plates 37 would be positioned along the rear of seat base 30 in the positions designated by eye bolts 35B in FIG. 2. However, the anchor plates 37 would be mounted to the vehicle floor 13 using bolts 38. Short sections of strap 39 would connect buckle element 40 to each anchor plate 37 at slots 43. A corresponding mating buckle member 41 would form a releasable removable connection as indicated by the arrow 42 in FIG. 5 between buckle element 40 and seat belt 34. Thus, with the embodiment of FIG. 5, quick release buckle connections could be formed for transferring the seat belts from the forwardly to the rearwardly facing positions depending upon the configurations selected for center seat 22.

In view of the numerous modifications which could be made to the preferred embodiments disclosed herein without departing from the scope or spirit of the present invention, the details herein are to be interpreted as illustrative and not in a limiting sense.

What is claimed as invention is:

1. A limousine construction comprising:
    (a) a limousine having an exterior body with forward engine compartment, rear luggage compartment, a roof, floor and sides defining an interior for containing passengers, with six doors including three right and three side doors, each with forward pivotally attached edges, the doors being positioned in pairs including forward, center and rear door pairs;
    (b) a plurality of seats including front, center, and rear seats, each extending transversely fully across the vehicle interior each seat having end portions that communicate with door openings of the respective front, center and rear pair of doors, so that passengers can access any of the seats from either side of the vehicle via any of the doors;
    (c) the center seat comprising:
        (i) a base anchored to the vehicle chassis floor;
        (ii) a generally L-shaped composite seat/seat back assembly movably mounted upon the base between a forward facing position in which the seat is in a position closely adjacent the vehicle floor and a rearward facing position in which the seat back is in a position closely adjacent the vehicle floor;
        (iii) first and second cushioned seat elements connected with respect to each other in an L configuration;
        (iv) a left seat support flange and a right seat support flange that rigidly hold each cushioned seat element with respect to the other,
        wherein the seat/seat back retains the generally L shape during transition between the forward and rearward facing positions; and
    (d) a moving seat support mechanism including a single left pivot arm and a single right pivot arm, each pivot arm being pivotally mounted at one end portion thereof to the base and being pivotally mounted at the opposite end portion thereof to one of the flanges, the pivot arms comprising means for translating the center seat upwardly with respect to the base during transition between the forward and rearward facing positions.

2. The limousine construction of claim 1, wherein the support flanges are generally L-shaped.

3. The limousine construction of claim 1, wherein the pivot arms each have upper end portions that pivotally attach to the center portion of the flanges.

4. The limousine construction of claim 3, wherein the flanges are shaped to conform to a portion of each of the seat element sides.

5. The limousine construction of claim 1 further comprising first and second pluralities of seat belt anchors positioned along front and rear respective surfaces of the center seat base.

* * * * *